(12) United States Patent
LeBlanc

(10) Patent No.: US 6,925,174 B2
(45) Date of Patent: Aug. 2, 2005

(54) INTERACTION BETWEEN ECHO CANCELLER AND PACKET VOICE PROCESSING

(75) Inventor: Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 175 days.

(21) Appl. No.: 10/081,678

(22) Filed: Feb. 22, 2002

(65) Prior Publication Data

US 2002/0080730 A1 Jun. 27, 2002

Related U.S. Application Data

(63) Continuation-in-part of application No. 09/522,185, filed on Mar. 9, 2000, which is a continuation-in-part of application No. 09/493,458, filed on Jan. 28, 2000, now Pat. No. 6,549,587, which is a continuation-in-part of application No. 09/454,219, filed on Dec. 9, 1999, now Pat. No. 6,882,711.

(51) Int. Cl.$^7$ .............................................. H04M 9/08
(52) U.S. Cl. ........................... 379/406.01; 379/406.02; 379/406.03; 379/406.04; 379/406.05; 379/406.06; 379/406.08
(58) Field of Search ...................... 379/406.01–406.16

(56) References Cited

U.S. PATENT DOCUMENTS 5,274,705 A * 12/1993 Younce et al. ......... 379/406.01
6,064,873 A * 5/2000 Eriksson et al. ....... 379/406.01
6,198,819 B1    3/2001 Farrell et al.
6,504,838 B1 * 1/2003 Kwan ..................... 379/406.01
6,574,336 B1 * 6/2003 Kirla ..................... 379/406.01
6,658,107 B1 * 12/2003 Sorqvist et al. ........ 379/406.01
2001/0033583 A1 * 10/2001 Rabenko et al. ....... 379/406.01
2002/0006137 A1   1/2002 Rabenko et al.

FOREIGN PATENT DOCUMENTS

| WO | WO99/60720 | 11/1999 |
|----|------------|---------|
| WO | WO01/22710 | 3/2001  |
| WO | WO01/33814 | 5/2001  |
| WO | WO01/80439 | 10/2001 |

* cited by examiner

*Primary Examiner*—Sinh Tran
*Assistant Examiner*—Ramnandan Singh
(74) *Attorney, Agent, or Firm*—McAndrews, Held & Malloy

(57) ABSTRACT

System and method for processing communication signals in a communication system having a detector for detecting a parameter of a communication signal. A communication signal is provided to a non-linear processor (NLP) adapted to examine the signal and to decide whether or not to enter an active state based upon a parameter of the signal. If the NLP enters an active state, the NLP performs non-linear processing on the signal. The NLP communicates to the detector whether the NLP is active or inactive. If the NLP is active, a processing step of the detector is disabled.

31 Claims, 9 Drawing Sheets

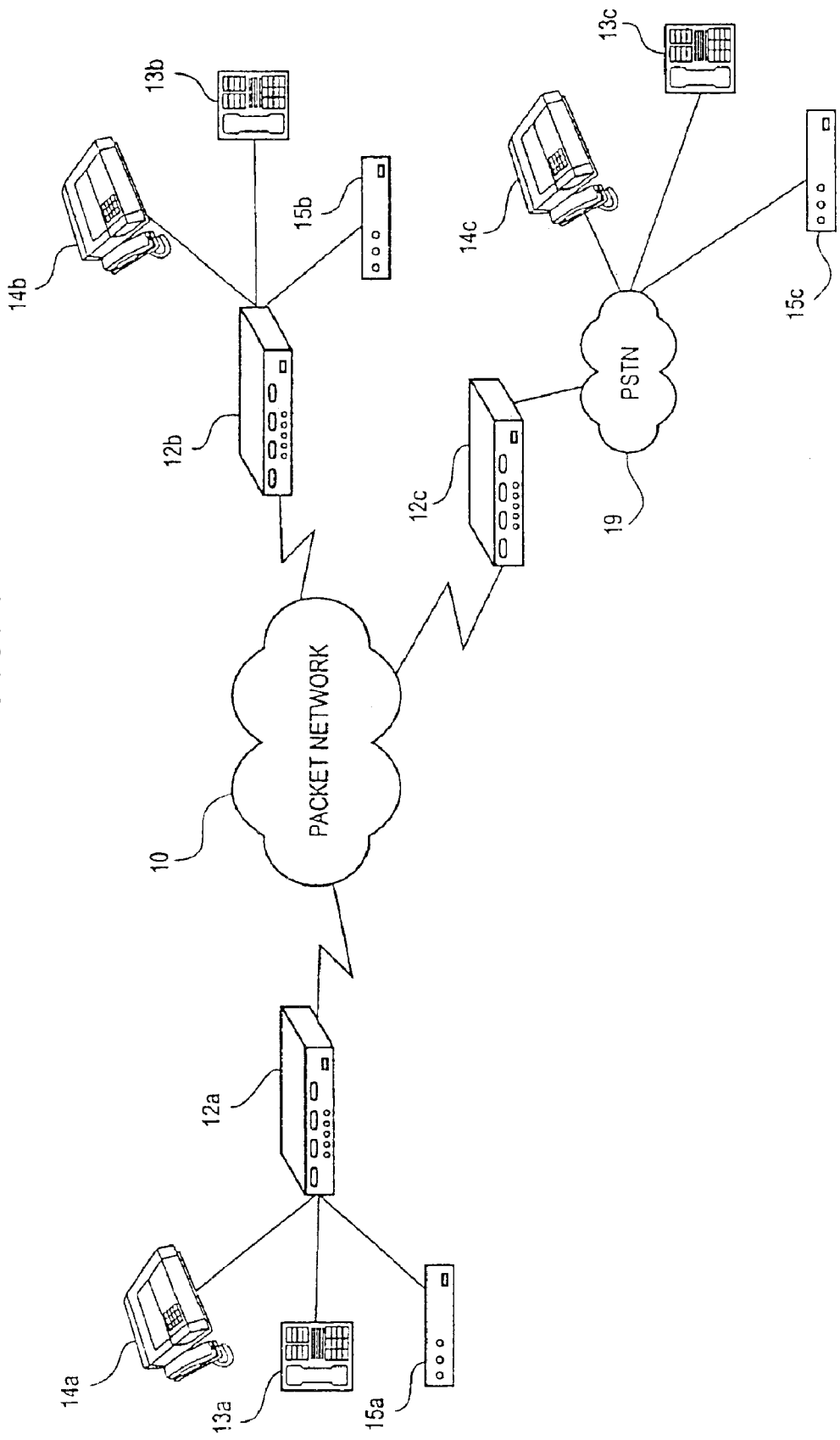

INTERACTION BETWEEN ECHO CANCELLER AND PACKET VOICE PROCESSING

CROSS-REFERENCE TO RELATED APPLICATIONS

The present application is a continuation-in-part of U.S. Patent application Ser. No. 09/522,185, filed Mar. 9, 2000, which is a continuation-in-part of application Ser. No. 09/493,458, filed Jan. 28, 2000 now U.S. Pat. No. 6,549,587, which is a continuation-in-part of application Ser. No. 09/454,219, filed Dec. 9, 1999 now U.S. Pat. No. 6,882,711, priority of each application which is hereby claimed under 35 U.S.C. § 120. All these applications are expressly incorporated herein by reference as though set forth in full.

FIELD OF THE INVENTION

The present invention relates generally to telecommunications systems, and more particularly, to a system for interfacing telephony devices with packet-based networks.

BACKGROUND OF THE INVENTION

Telephony devices, such as telephones, analog fax machines, and data modems, have traditionally utilized circuit-switched networks to communicate. With the current state of technology, it is desirable for telephony devices to communicate over the Internet, or other packet-based networks. Heretofore, an integrated system for interfacing various telephony devices over packet-based networks has been difficult due to the different modulation schemes of the telephony devices. Accordingly, it would be advantageous to have an efficient and robust integrated system for the exchange of voice, fax data and modem data between telephony devices and packet-based networks.

An echo canceller is a device that removes the echo present in a communication signal, typically by employing a linear transversal filter. Due to non-linearities in hybrid and digital/analog loops and estimation uncertainties, linear cancellers cannot entirely remove the echo present. A non-linear device, commonly referred to as a non-linear processor (NLP), can be used to remove the remaining echo. This device may be a variable loss inserted into the system or a device that removes the entire signal and injects noise with the correct level, and possibly the correct spectrum.

A packet voice system contains many detectors that detect various parameters of the communication signal, such as voice activity levels, dual-tone multi-frequency signals, call progress tones, FAX/modem tones, etc. Because certain assumptions about the communication signal can be made based upon the state of the NLP, at times the functions of these various detectors can be unnecessary and/or redundant.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a method of processing communication signals in a communication system having a detector for detecting a parameter of a communication signal. Pursuant to the method, a communication signal is provided to a non-linear processor (NLP) adapted to examine the signal and to decide whether or not to enter an active state based upon a parameter of the signal. If the NLP enters an active state, the NLP performs non-linear processing on the signal. The NLP communicates to the detector whether the NLP is active or inactive. If the NLP is active, a processing step of the detector is disabled.

Another aspect of the present invention is directed to a communication system having a non-linear processor (NLP) and a detector. The NLP receives a communication signal and is adapted to decide whether or not to enter an active state based upon a parameter of the signal. If the NLP enters an active state, the NLP performs non-linear processing on the signal. The detector is adapted to detect a parameter of the communication signal. The NLP communicates with the detector to indicate whether the NLP is active or inactive. If the NLP is active, a processing step of the detector is disabled.

Another aspect of the present invention is directed to a communication system having a non-linear processor (NLP) and a detector. The NLP receives a communication signal and is adapted to decide whether or not to enter an active state based upon a parameter of the signal. If the NLP enters an active state, the NLP performs non-linear processing on the signal. The detector is adapted to detect a parameter of the communication signal by analyzing the communication signal that is provided to the NLP. The NLP communicates with the detector to indicate whether the NLP is active or inactive. If the NLP is active, a processing step of the detector is disabled.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 1 is a block diagram of a packet-based infrastructure providing a communication medium with a number of telephony devices in accordance with a preferred embodiment of the present invention.

DETAILED DESCRIPTION

Figure 1A:
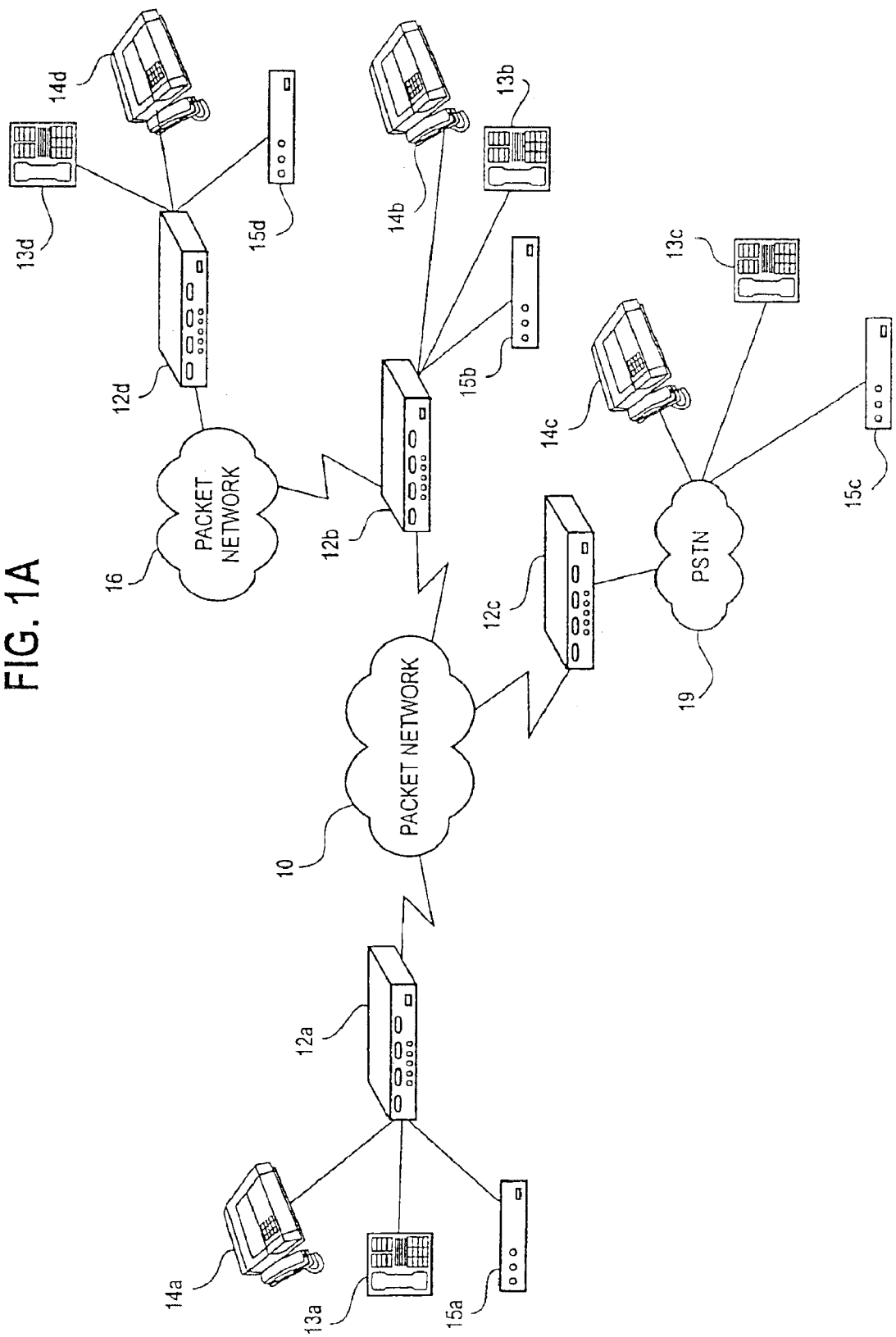
FIG. 1A is a block diagram of a packet-based infrastructure providing a communication medium with a number of telephony devices in accordance with a preferred embodiment of the present invention.

An Embodiment of a Signal Processing System

In one embodiment of the present invention, a signal processing system is employed to interface telephony devices with packet-based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. The described embodiment of the signal processing system can be implemented with a variety of technologies including, by way of example, embedded communications software that enables transmission of information, including voice, fax and modem data over packet-based networks. The embedded communications software is preferably run on programmable digital signal processors (DSPs) and is used in gateways, cable modems, remote access servers, PBXs, and other packet-based network appliances.

An exemplary topology is shown in FIG. 1 with a packet-based network 10 providing a communication medium between various telephony devices. Each network gateway 12a, 12b, 12c includes a signal processing system which provides an interface between the packet-based network 10 and a number of telephony devices. In the described exemplary embodiment, each network gateway 12a, 12b, 12c supports a fax machine 14a, 14b, 14c, a telephone 13a, 13b, 13c, and a modem 15a, 15b, 15c. Each network gateway 12a, 12b, 12c could support a variety of different telephony arrangements. By way of example, each network gateway might support any number telephony devices and/or circuit-switched/packet-based networks including, among others, analog telephones, ethernet phones, fax machines, data modems, PSTN lines (Public Switching Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet-based system.

Another exemplary topology is shown in FIG. 1A. The topology of FIG. 1A is similar to that of FIG. 1 but includes a second packet-based network 16 that is connected to packet-based network 10 and to telephony devices 13b, 14b and 15b via network gateway 12b. The signal processing system of network gateway 12b provides an interface between packet-based network 10 and packet-based network 16 in addition to an interface between packet-based networks 10, 16 and telephony devices 13b, 14b and 15b. Network gateway 12d includes a signal processing system which provides an interface between packet-based network 16 and fax machine 14d, telephone 13d, and modem 15d.

Figure 2:
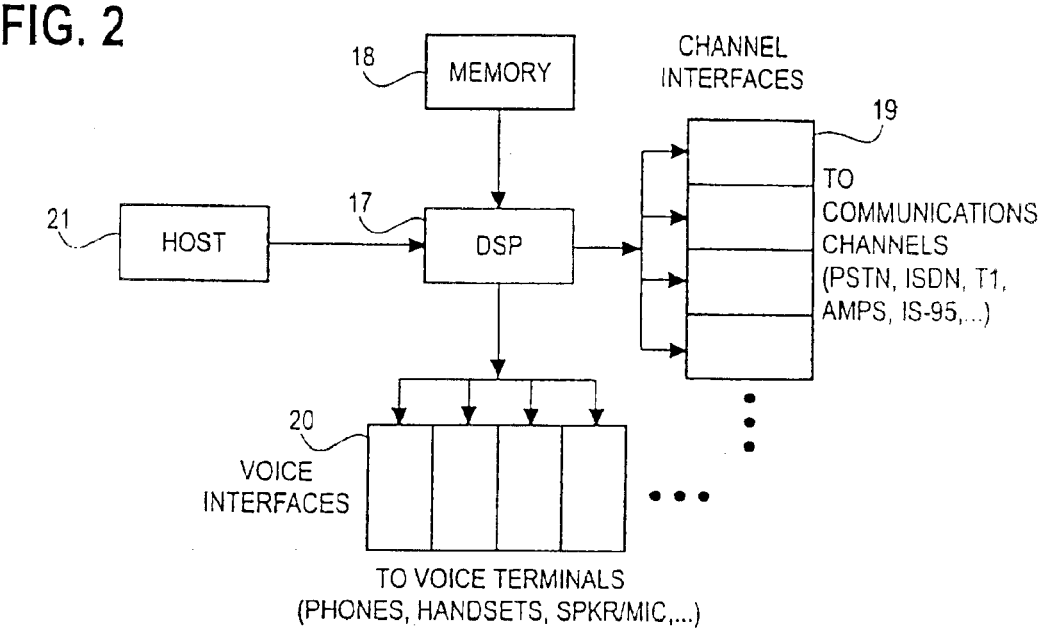
FIG. 2 is a block diagram of a signal processing system implemented with a programmable digital signal processor (DSP) software architecture in accordance with a preferred embodiment of the present invention.

The exemplary signal processing system can be implemented with a programmable DSP software architecture as shown in FIG. 2. This architecture has a DSP 17 with memory 18 at the core, a number of network channel interfaces 19 and telephony interfaces 20, and a host 21 that may reside in the DSP itself or on a separate microcontroller. The network channel interfaces 19 provide multi-channel access to the packet-based network. The telephony interfaces 23 can be connected to a circuit-switched network interface such as a PSTN system, or directly to any telephony device. The programmable DSP is effectively hidden within the embedded communications software layer. The software layer binds all core DSP algorithms together, interfaces the DSP hardware to the host, and provides low-level services such as the allocation of resources to allow higher level software programs to run.

Figure 3:
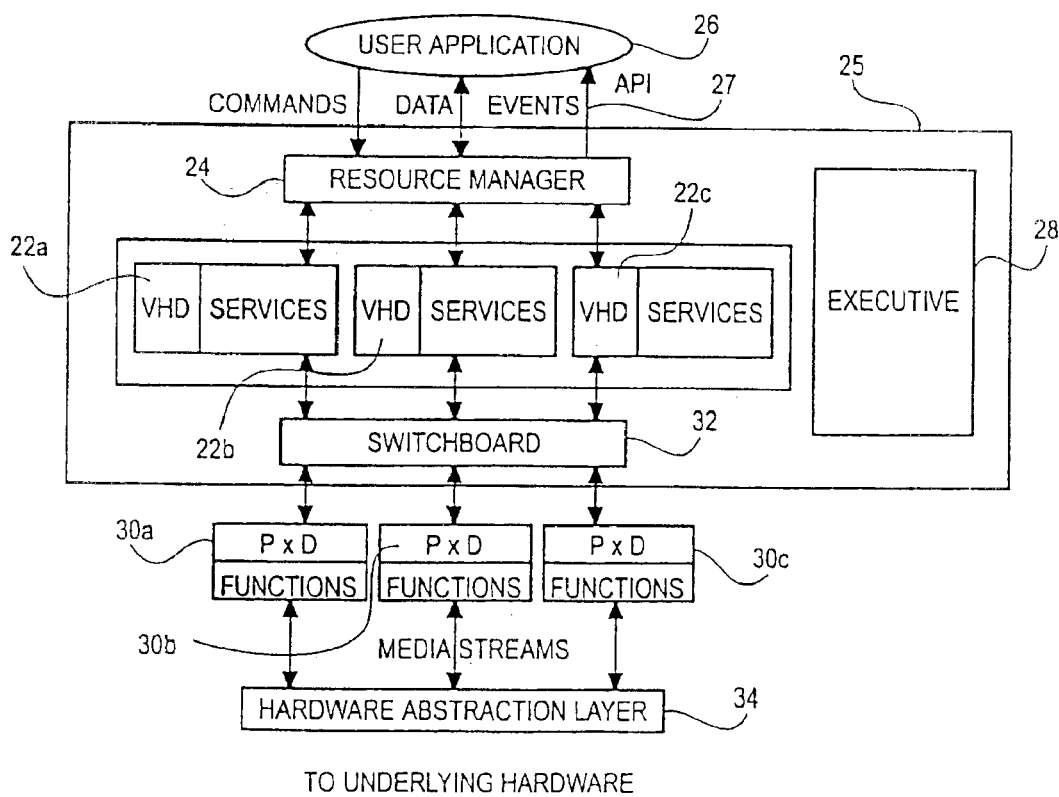
FIG. 3 is a block diagram of the software architecture operating on the DSP platform of FIG. 2 in accordance with a preferred embodiment of the present invention.

An exemplary multi-layer software architecture operating on a DSP platform is shown in FIG. 3. A user application layer 26 provides overall executive control and system management, and directly interfaces a DSP server 25 to the host 21 (see to FIG. 2). The DSP server 25 provides DSP resource management and telecommunications signal processing. Operating below the DSP server layer are a number of physical devices (PXD) 30a, 30b, 30c. Each PXD provides an interface between the DSP server 25 and an external telephony device (not shown) via a hardware abstraction layer (HAL) 34.

The DSP server 25 includes a resource manager 24 which receives commands from, forwards events to, and exchanges data with the user application layer 26. The user application layer 26 can either be resident on the DSP 17 or alternatively on the host 21 (see FIG. 2), such as a microcontroller. An application programming interface 27 (API) provides a software interface between the user application layer 26 and the resource manager 24. The resource manager 24 manages the internal/external program and data memory of the DSP 17. In addition the resource manager dynamically allocates DSP resources, performs command routing as well as other general purpose functions.

The DSP server 25 also includes virtual device drivers (VHDs) 22a, 22b, 22c. The VHDs are a collection of software objects that control the operation of and provide the facility for real time signal processing. Each VHD 22a, 22b, 22c includes an inbound and outbound media queue (not shown) and a library of signal processing services specific to that VHD 22a, 22b, 22c. In the described exemplary embodiment, each VHD 22a, 22b, 22c is a complete self-contained software module for processing a single channel with a number of different telephony devices. Multiple channel capability can be achieved by adding VHDs to the DSP server 25. The resource manager 24 dynamically controls the creation and deletion of VHDs and services.

A switchboard 32 in the DSP server 25 dynamically inter-connects the PXDs 30a, 30b, 30c with the VHDs 22a, 22b, 22c. Each PXD 30a, 30b, 30c is a collection of software objects which provide signal conditioning for one external telephony device. For example, a PXD may provide volume and gain control for signals from a telephony device prior to communication with the switchboard 32. Multiple telephony functionalities can be supported on a single channel by connecting multiple PXDs, one for each telephony device, to a single VHD via the switchboard 32. Connections within the switchboard 32 are managed by the user application layer 26 via a set of API commands to the resource manager 24. The number of PXDs and VHDs is expandable, and limited only by the memory size and the MIPS (millions instructions per second) of the underlying hardware.

A hardware abstraction layer (HAL) 34 interfaces directly with the underlying DSP 17 hardware (see FIG. 2) and exchanges telephony signals between the external telephony devices and the PXDs. The HAL 34 includes basic hardware interface routines, including DSP initialization, target hardware control, codec sampling, and hardware control interface routines. The DSP initialization routine is invoked by the user application layer 26 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 34 is a physical firmware layer that isolates the communications software from the underlying hardware. This methodology allows the communications software to be ported to various hardware platforms by porting only the affected portions of the HAL 34 to the target hardware.

The exemplary software architecture described above can be integrated into numerous telecommunications products. In an exemplary embodiment, the software architecture is designed to support telephony signals between telephony devices (and/or circuit-switched networks) and packet-based networks. A network VHD (NetVHD) is used to provide a single channel of operation and provide the signal processing services for transparently managing voice, fax, and modem data across a variety of packet-based networks. More particularly, the NetVHD encodes and packetizes DTMF, voice, fax, and modem data received from various telephony devices and/or circuit-switched networks and transmits the packets to the user application layer. In addition, the NetVHD disassembles DTMF, voice, fax, and modem data from the user application layer, decodes the packets into signals, and transmits the signals to the circuit-switched network or device.

Figure 4:
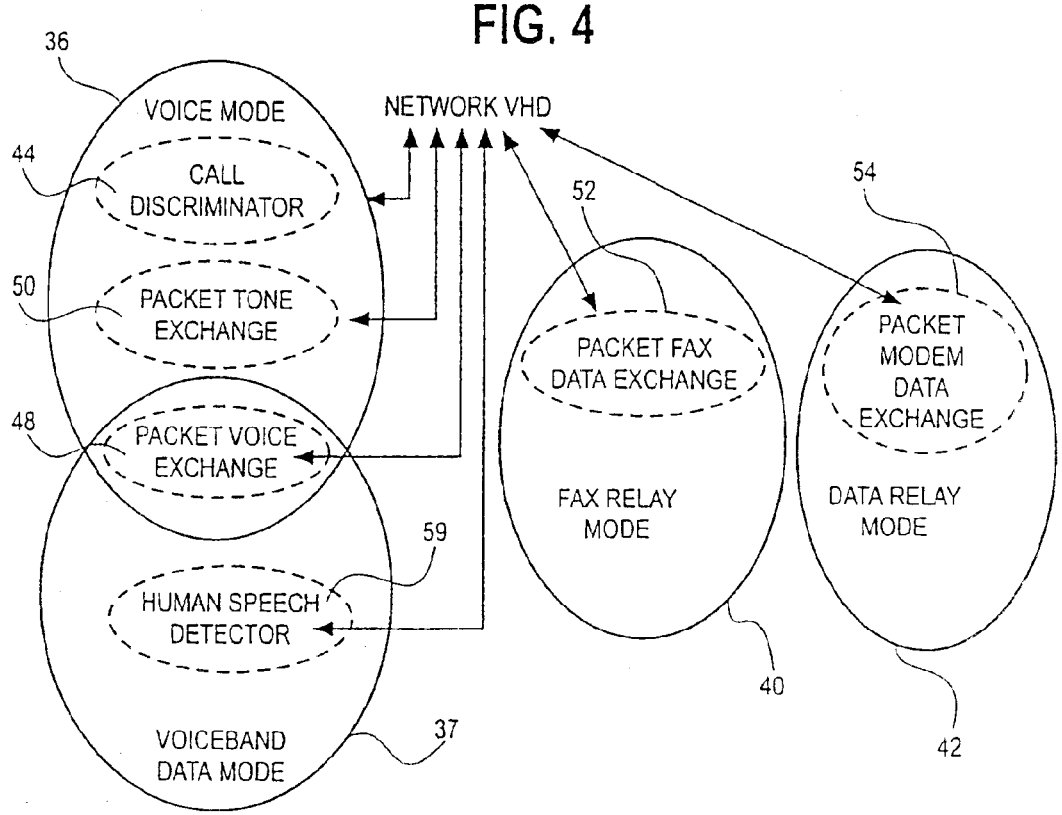
FIG. 4 is a state machine diagram of the operational modes of a virtual device driver for packet-based network applications in accordance with a preferred embodiment of the present invention.

An exemplary embodiment of the NetVHD operating in the described software architecture is shown in FIG. 4. The NetVHD includes four operational modes, namely voice mode 36, voiceband data mode 37, fax relay mode 40, and data relay mode 42. In each operational mode, the resource manager invokes various services. For example, in the voice mode 36, the resource manager invokes call discrimination 44, packet voice exchange 48, and packet tone exchange 50. The packet voice exchange 48 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP) B Annex A: Reduced complexity 8 kbit/s CS-ACELP speech codec), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations being incorporated herein by reference as if set forth in full.

The packet voice exchange 48 is common to both the voice mode 36 and the voiceband data mode 37. In the voiceband data mode 37, the resource manager invokes the packet voice exchange 48 for exchanging transparently data without modification (other than packetization) between the telephony device (or circuit-switched network) and the packet-based network. This is typically used for the exchange of fax and modem data when bandwidth concerns are minimal as an alternative to demodulation and remodulation. During the voiceband data mode 37, the human speech detector service 59 is also invoked by the resource manager. The human speech detector 59 monitors the signal from the near end telephony device for speech. In the event that speech is detected by the human speech detector 59, an event is forwarded to the resource manager which, in turn, causes the resource manager to terminate the human speech detector service 59 and invoke the appropriate services for the voice mode 36 (i.e., the call discriminator, the packet tone exchange, and the packet voice exchange).

In the fax relay mode 40, the resource manager invokes a fax exchange 52 service. The packet fax exchange 52 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second. Likewise, the resource manager invokes a packet data exchange 54 service in the data relay mode 42. The packet data exchange 52 may employ various data pumps including, among others, V.22bis/NV.22 with data rates up to 2400 bits per second, V.32bis/V.32, which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet-based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode 36 and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

The Voice Mode

Figure 5:
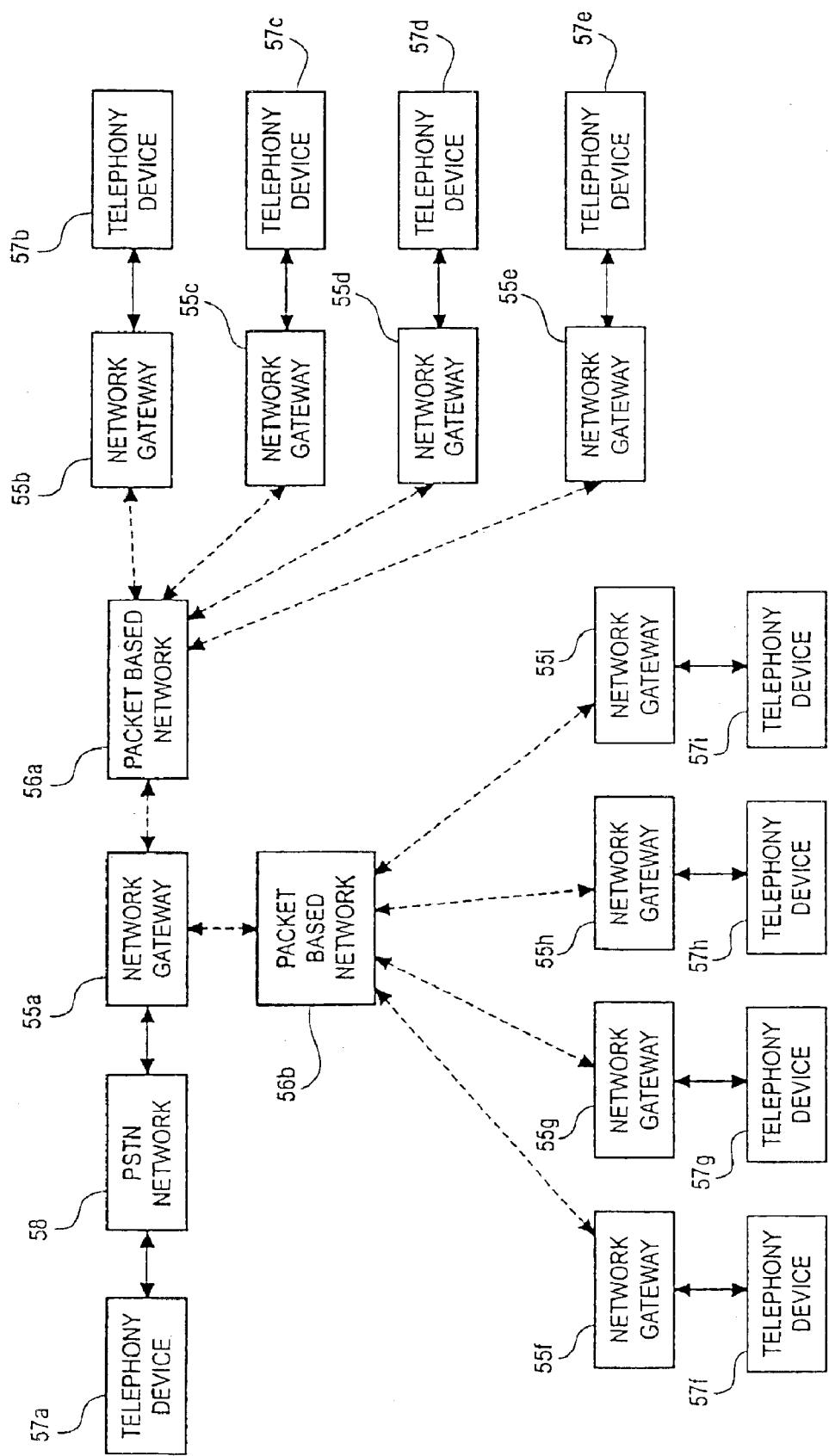
FIG. 5 is a block diagram of several signal processing systems in the voice mode for interfacing between a switched circuit network and a packet-based network in accordance with a preferred embodiment of the present invention.

Voice mode provides signal processing of voice signals. As shown in the exemplary embodiment depicted in FIG. 5, voice mode enables the transmission of voice over a packet-based system such as Voice over IP (VoIP, H.323), Voice over Frame Relay (VoFR, FRF-11), Voice Telephony over ATM (VTOA), or any other proprietary network. The voice mode should also permit voice to be carried over traditional media such as time division multiplex (TDM) networks and voice storage and playback systems. Network gateway 55a supports the exchange of voice between a traditional circuit-switched network 58 and packet-based networks 56(a) and 56(b). Network gateways 55b, 55c, 55d, 55e support the exchange of voice between packet-based network 56a and a number of telephony devices 57b, 57c, 57d, 57e. In addition, network gateways 55f, 55g, 55h, 55i support the exchange of voice between packet-based network 56b and telephony devices 57f, 57g, 57h, 57i. Telephony devices 57a, 57b, 57c, 57d, 57e, 55f, 55g, 55h, 55i can be any type of telephony device including telephones, facsimile machines and modems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 6:
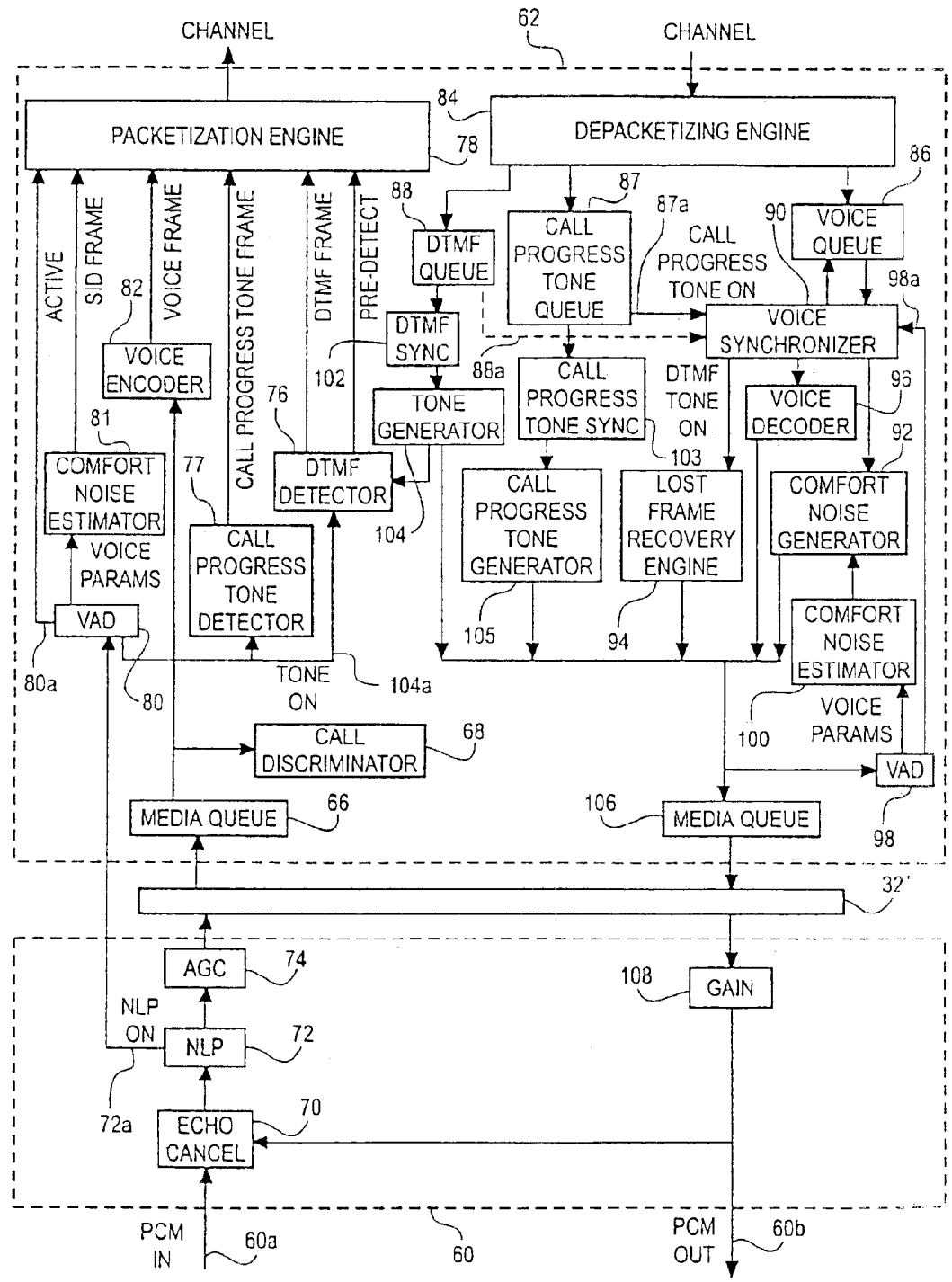
FIG. 6 is a system block diagram of a signal processing system operating in a voice mode in accordance with a preferred embodiment of the present invention.

The services invoked by the network VHD in the voice mode and the associated PXD is shown schematically in FIG. 6. In the described exemplary embodiment, the PXD 60 provides two way communication with a telephone or a circuit-switched network, such as a PSTN line (e.g. DS0) carrying a 64 kb/s pulse code modulated (PCM) signal, i.e., digital voice samples.

The incoming PCM signal 60a is initially processed by the PXD 60 to remove far end echoes that might otherwise be transmitted back to the far end user. As the name implies, echoes in telephone systems is the return of the talker's voice resulting from the operation of the hybrid with its two-four wire conversion. If there is low end-to-end delay, echo from the far end is equivalent to side-tone (echo from the near end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 70 is used to remove echoes from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 that, in an illustrative embodiment, mutes the digital voice samples when far end speech is detected in the absence of near end speech. The echo canceller 70 may also inject comfort noise, which in the absence of near end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. As described above with reference to FIG. 4, if either tone or HDLC flags are detected, the voice mode services are terminated and the appropriate service for fax or modem operation is initiated. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should be disabled when the NLP 72 is activated. This is accomplished by a "NLP on" message 72a passed from the NLP 72 to the VAD 80.

The voice encoder 82, operating under the packet voice exchange, can be a straight 16 bit PCM encoder or any voice encoder which supports one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 76 determines whether or not there is a DTMF signal present at the near end. The DTMF detector 76 also provides a pre-detection flag 76a that indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are tones that indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status, which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a depacketizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The depacketizing engine 84 identifies the type of packets received from the host (i.e., voice packet, DTMF packet, call progress tone packet, SID packet) and transforms them into frames that are protocol independent. The depacketizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 92 from the voice parameters in the SID packets buffered in the voice queue 86. However, for some protocols, namely, FRF-11, the SID packets are optional, and other far end users may not support SID packets at all. In these systems, the voice synchronizer 90 must continue to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames that may be queued are discarded when DTMF packets arrive. This will ensure that there is a significant gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

When call progress tone packets arrive, they are depacketized by the depacketizing engine 84. Call progress tone frames at the output of the depacketizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames that may be queued are discarded when call progress tone packets arrive to ensure that there is a significant inter-digit gap before call progress tones are generated. This is achieved by a "tone present" message 87a passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60b.

The outgoing PCM signal in the media queue 106 is coupled to the PXD 60 via the switchboard 32'. The outgoing PCM signal is coupled to an amplifier 108 before being outputted on the PCM output line 60b.

Echo Canceller with NLP

The problem of line echoes such as the reflection of the talker's voice resulting from the operation of the hybrid with its two-four wire conversion is a common telephony problem. To eliminate or minimize the effect of line echoes in the described exemplary embodiment of the present invention, an echo canceller with non-linear processing is used. Although echo cancellation is described in the context of a signal processing system for packet voice exchange, those skilled in the art will appreciate that the techniques described for echo cancellation are likewise suitable for various applications requiring the cancellation of reflections, or other undesirable signals, from a transmission line. Accordingly, the described exemplary embodiment for echo cancellation in a signal processing system is by way of example only and not by way of limitation.

In the described exemplary embodiment the echo canceller preferably complies with one or more of the following ITU-T Recommendations G.164 (1988)—Echo Suppressors, G.165 (March 1993)—Echo Cancellers, and G.168 (April 1997)—Digital Network Echo Cancellers, the contents of which are incorporated herein by reference as though set forth in full. The described embodiment merges echo cancellation and echo suppression methodologies to remove the line echoes that are prevalent in telecommunication systems. Typically, echo cancellers are favored over echo suppressors for superior overall performance in the presence of system noise such as, for example, background music, double talk etc., while echo suppressors tend to perform well over a wide range of operating conditions where clutter such as system noise is not present.

For a variety of reasons, such as for example, non-linearities in the hybrid and tail circuit, estimation errors, noise in the system, etc., the linear portion of the echo canceller in FIG. 6, 70 (FIR or transversal filter) may not identically model the transfer characteristics of the telephone line circuit so that the echo canceller may be unable to cancel all of the resulting echo. Therefore, a non-linear processor (NLP) 74 is used to suppress the residual echo during periods of far end active speech with no near end speech.

In one embodiment, the NLP 140 may be implemented with a suppressor that adaptively suppresses down to the background noise level, a suppressor that suppresses completely and inserts comfort noise with a spectrum that models the true background noise, or a combination thereof.

Figure 7:
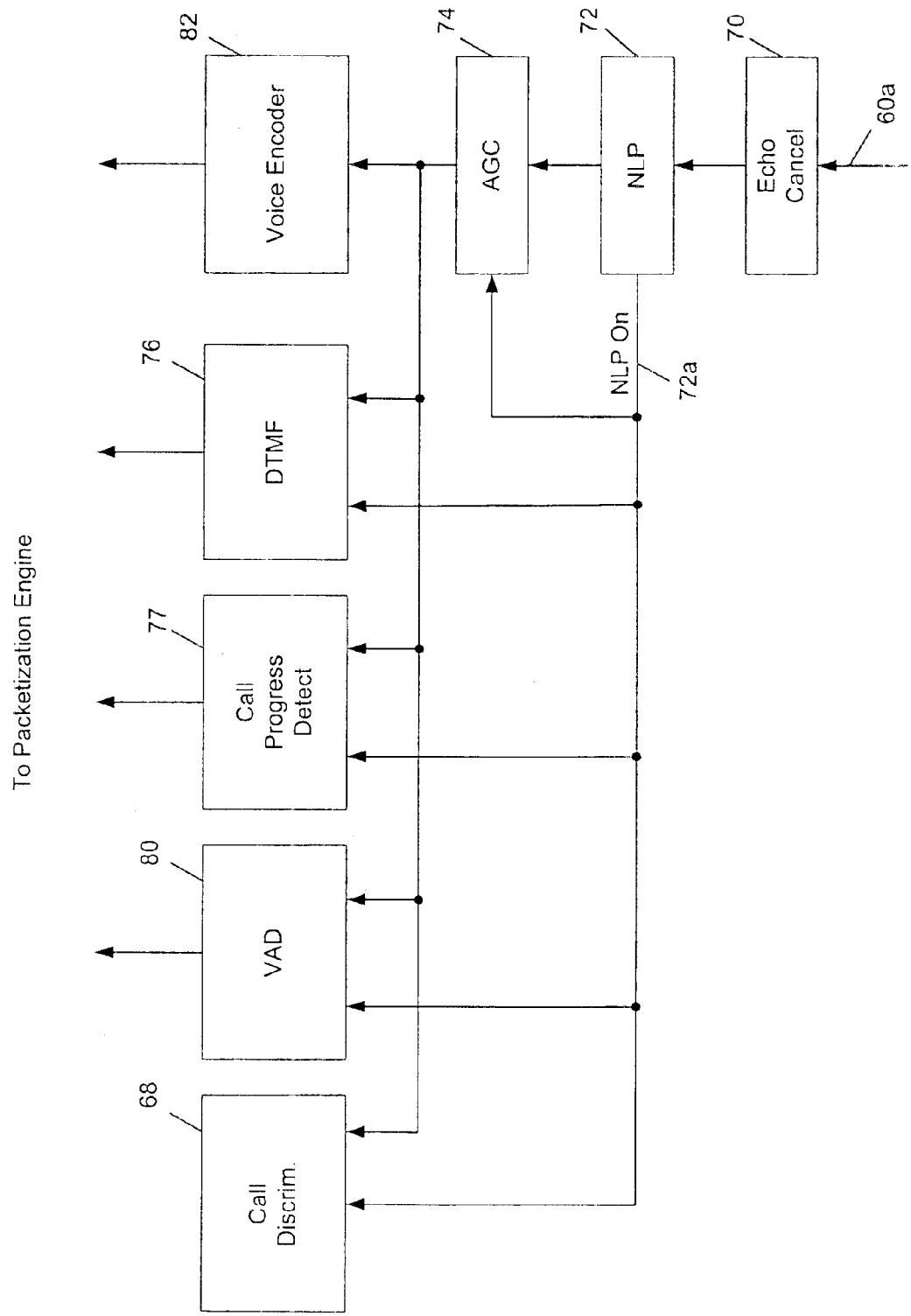
FIG. 7 is a block diagram showing the interaction of an echo canceller and a non-linear processor with various system detectors according to an illustrative embodiment of the present invention.

In an illustrative embodiment of the present invention, the NLP 72 interacts with various system detectors, such as voice activity detector (VAD) 80, DTMF detector 76, call progress detector 77, call discriminator 68 and automatic gain control (AGC) 74 as illustrated in the block diagram of FIG. 7. In FIG. 7, elements that are common to FIG. 6 share the same element numbers. As shown in FIG. 7, the NLP state signal 72a is provided to VAD 80, DTMF detector 76, call progress detector 77, call discriminator 68 and AGC 74. NLP state signal 72a indicates whether the NLP 72 is active or inactive. The detectors disable one or more processing steps based on the state of the NLP 72. In an illustrative embodiment, when the NLP 72 sends an indication that it is on, one or more of the detectors 68, 74, 76, 77, and 80 enter a known inactive state. Illustratively, in this known inactive state, the detectors perform no processing functions, except, in one embodiment, updating their internal state.

In an exemplary embodiment of the present invention, when the NLP 72 is activated, the VAD 80 declares that voice is not present, since the NLP 72 is only activated when voice is not present. Also, the VAD 80 does not update its background noise estimates when the NLP 72 is active. These features enhance VAD performance.

When the NLP 72 is activated, the DTMF detector 76 does not detect DTMF (dual-tone multiple-frequency) tones, because when the NLP 72 is active, DTMF tones are either not present or, if they were present, they would be corrupted enough to be undetectable. Making the DTMF detector 76 inactive while the NLP 72 is active reduces DTMF average complexity.

Also, when the NLP 72 is activated the call progress tone detector 77 does not detect call progress tones, as when the NLP 72 is active, call progress tones are either not present or, if they were present, they would be corrupted enough to be undetectable. Making the call progress detector 77 inactive while the NLP 72 is active reduces the call progress detector average complexity.

The call discriminator 68 also does not detect FAX and modem tones when the NLP 72 is activated. Making the call discriminator 68 inactive while the NLP 72 is active reduces the call progress detector average complexity.

Additionally, when the NLP 72 is activated, the automatic gain control (AGC) element 74 ceases detecting whether or not voice is present and also ceases adjusting the gain of any voice signal present, since the NLP 72 is only activated when voice is not present. This helps the AGC 74 to estimate the gain.

Disabling some or all of the functions of detectors such as VAD 80, DTMF detector 76, call progress detector 77, call discriminator 68 and AGC 74 when the NLP 72 is active reduces the system complexity since the detectors consequently use low resources when (processor cycles) when the NLP 72 is on. Furthermore, when the NLP 72 is on, the echo canceller 70 is normally using a high amount of processor capacity, because the adaptation decision and NLP decision are usually related. Reducing average processor loading can decrease power requirements, increase channel density (number of voice channels supported per device), and decrease cost per channel.

Figure 8:
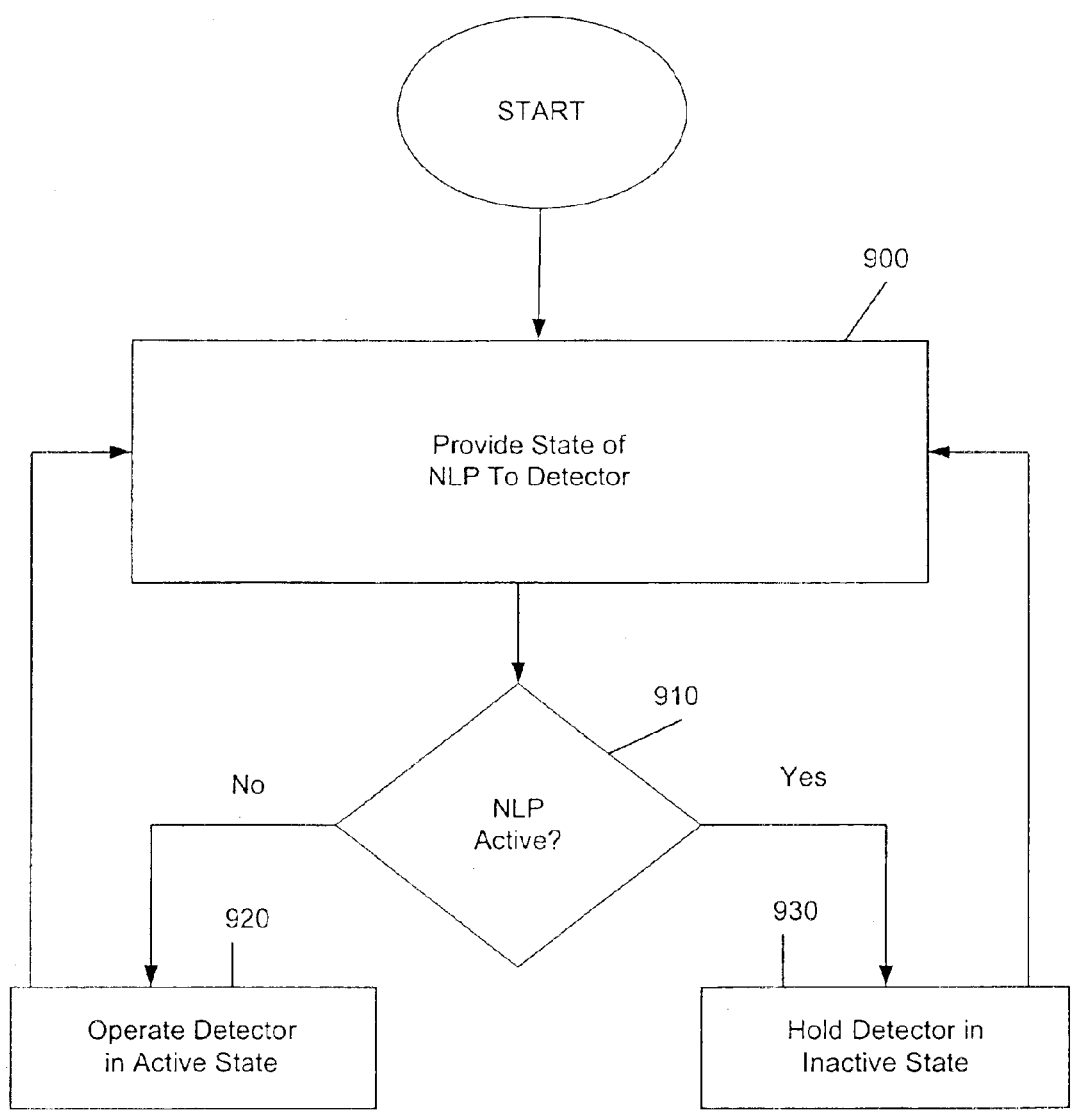
FIG. 8 is a flow chart representing a method of processing communication signals in a communication system having a detector for detecting a parameter of a communication signal according to an illustrative embodiment of the present invention.

FIG. 8 is a flow chart representing a method of processing communication signals in a communication system having a detector for detecting a parameter of a communication signal, according to an illustrative embodiment of the present invention. At step 900, the NLP state is provided to the detector via a NLP status line such as NLP status line 72a. At decision box 910, it is queried whether the NLP 72 is active or inactive. If the NLP is inactive, the detector is operated in an active state, as shown at step 920. If the NLP is active, the detector is held in an inactive state, as shown by step 930. In an illustrative embodiment of the present invention, the process of monitoring the NLP status and setting the detector status accordingly is performed continuously during operation of the communication system. Thus, after steps 920 and 930 of FIG. 8, process control returns to step 900 of providing the NLP state to the detector.

Figure 9:
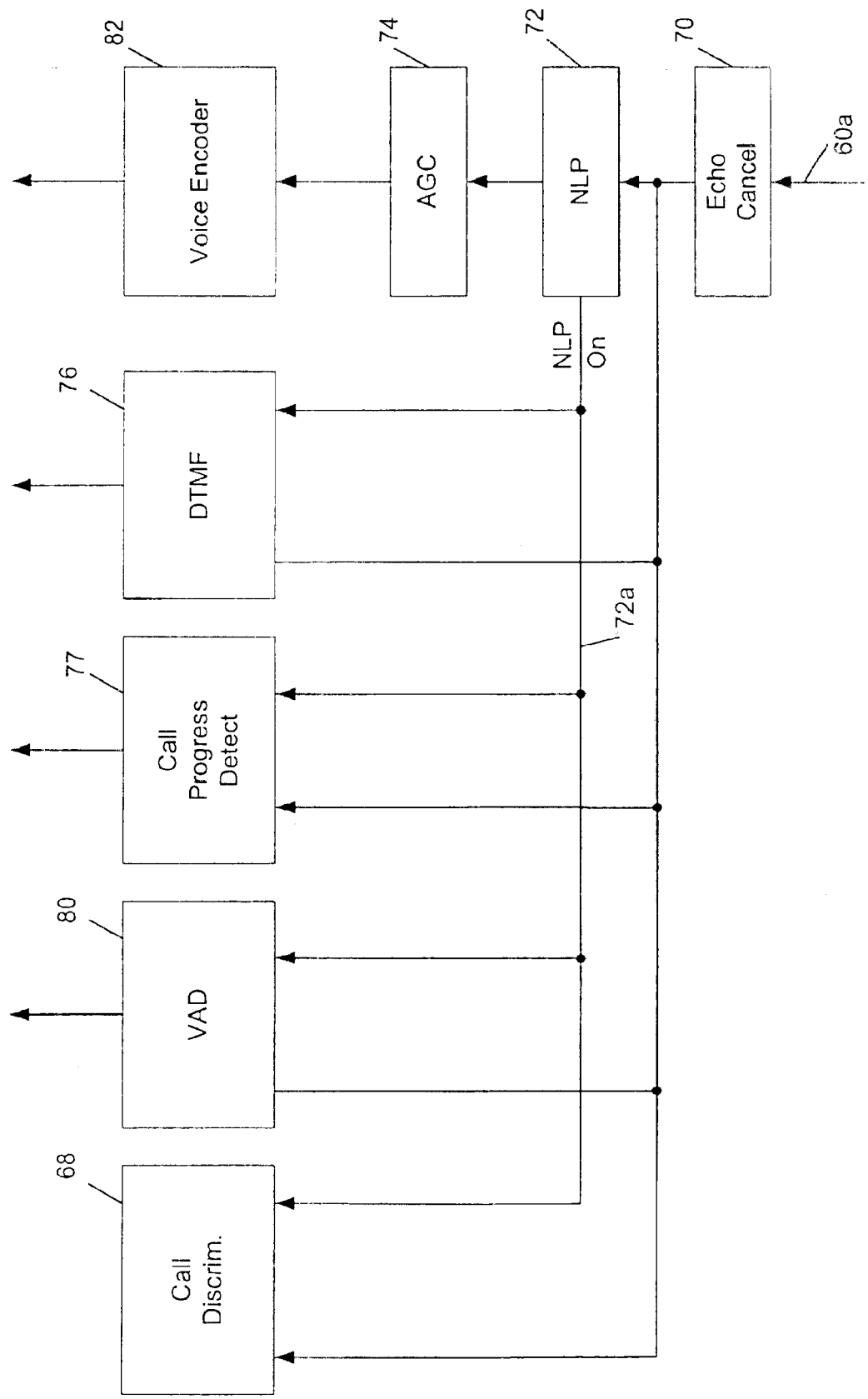
FIG. 9 is a block diagram showing the interaction of an echo canceller and a non-linear processor with various system detectors according to an illustrative embodiment of the present invention.

FIG. 9 is a block diagram showing the interaction of the echo canceller 70 and the NLP 72 with various system detectors according to an illustrative embodiment of the present invention. The system of FIG. 9 is similar to that of FIG. 7, but FIG. 9 shows that the signal before the NLP 72 is used to drive the detectors, i.e., VAD 80, DTMF detector 76, call progress detector 77 and call discriminator 68, as opposed to the system of FIG. 7 wherein the detectors are driven by the signal as output by AGC 74 prior to providing the signal to the voice encoder 82. Taking the signal prior to input to the NLP 72 removes, for example, any possibility of the NLP 72 clipping tone-on or tone-off events. This has advantages in reducing NLP clipping although it increases the chance of residual echo increasing detector errors.

Although a preferred embodiment of the present invention has been described, it should not be construed to limit the scope of the appended claims. For example, the present invention is applicable to any real-time media, such as audio and video, in addition to the voice media illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of processing communication signals in a communication system having a tone detector for detecting a tone in a communication signal, comprising steps of:
   (a) receiving a communication signal with a non-linear processor (NLP) adapted to examine the signal and to decide whether or not to enter an active state based upon a parameter of the signal, wherein if the NLP enters an active state, the NLP performs non-linear processing on the signal;
   (b) indicating to the tone detector whether the NLP is active or inactive; and
   (c) if the NLP is active, disabling a processing step of the tone detector.

2. The method of claim 1 wherein the NLP is adapted to decide whether or not to enter an active state based at least in part on whether the communication signal is active or inactive, wherein if the communication signal is active, the NLP enters or remains in an inactive state.

3. The method of claim 1 wherein providing step (a) comprises providing a near-end communication signal to an NLP, wherein the NLP is adapted to detect whether a far-end signal is active or inactive, wherein if the near-end signal is inactive and the far-end signal is active, the NLP enters an active state.

4. The method of claim 3 wherein if the NLP enters an active state, the NLP suppresses echo present in the near-end signal.

5. The method of claim 1 wherein disabling step (c) comprises causing the tone detector to enter an inactive state if the NLP is active.

6. The method of claim 1 wherein the communication system has a plurality of tone detectors for detecting parameters of a communication signal, wherein indicating step (b) comprises communicating to plurality of tone detectors whether the NLP is active or inactive and wherein disabling step (c) comprises disabling a processing step of the plurality of tone detectors if the NLP is active.

7. The method of claim 1 wherein the detector comprises a dual-tone multiple-frequency (DTMF) detector adapted to detect DTMF signals in the communication signal and wherein disabling step (c) comprises causing the DTMF detector to cease detecting DTMF signals in the communication signal if the NLP is active.

8. The method of claim 1 wherein the detector comprises a call progress detector adapted to detect call progress tones in the communication signal and wherein disabling step (c) comprises causing the call progress detector to cease detecting call progress tones in the communication signal if the NLP is active.

9. The method of claim 1 wherein the detector comprises a call discriminator adapted to detect facsimile tones and modem tones in the communication signal and wherein disabling step (c) comprises causing the call discriminator to cease detecting facsimile tones and modem tonesin the communication signal if NLP is active.

10. A communication system comprising:
a non-linear processor (NLP) adapted to receive a communication signal and to decide whether or not to enter an active state based upon a parameter of the signal, wherein if the NLP enters an active state, the NLP performs non-linear processing on the signal; and
a tone detector adapted to detect a tone in the communication signal, wherein the NLP communicates with the tone detector to indicate whether the NLP is active or inactive, wherein if the NLP is active, a processing step of the tone detector is disabled.

11. The communication system of claim 10 wherein the NLP is adapted to decide whether or not to enter an active state based at least in part on whether the communication signal is active or inactive, wherein if the communication signal is active, the NLP enters or remains in an inactive state.

12. The communication system of claim 10 wherein the communication signal that the NLP is adapted to receive is a near-end signal and wherein the NLP is adapted to detect whether a far-end signal is active or inactive, wherein if the near-end signal is inactive and the far-end signal is active, the NLP enters an active state.

13. The method of claim 12 wherein if the NLP enters an active state, the NLP suppresses echo present in the near-end signal.

14. The communication system of claim 12 wherein the NLP receives the near-end signal from an echo canceller adapted to receive a near-end communication signal, to sample the far-end communication signal, to cancel echo present in the near-end signal using linear processing, and to provide a resulting echo-compensated near-end signal to the NLP.

15. The communication system of claim 10 wherein if the NLP indicates that the NLP is active, the tone detector enters an inactive state.

16. The communication system of claim 10 comprising a plurality of tone detectors for detecting tones in a communication signal, wherein the NLP communicates with the plurality of tone detectors to indicate whether the NLP is active or inactive, wherein if the NLP is active, a processing step of a plurality of tone detectors are disabled.

17. The communication system of claim 10 wherein the detector comprises a dual-tone multiple-frequency (DTMF) detector adapted to detect DTMF signals in the communication signal and wherein if the NLP indicates that the NLP is active, the DTMF detector ceases to detect DTMF signals in the communication signal.

18. The communication system of claim 10 wherein the detector comprises a call progress detector adapted to detect call progress tones in the communication signal and wherein the call progress detector ceases to detect call progress tones in the communication signal if the NLP indicates that the NLP is active.

19. The communication system of claim 10 wherein the detector comprises a call discriminator adapted to detect facsimile tones and modem tones in the communication signal and wherein the call discriminator ceases to detect facsimile tones and modem tones in the communication signal if NLP indicates that the NLP is active.

20. A communication system comprising:
a non-linear processor (NLP) adapted to receive a communication signal and to decide whether or not to enter an active state based upon a parameter of the signal, wherein if the NLP enters an active state, the NLP performs non-linear processing on the signal; and
a tone detector adapted to detect a tone in the communication signal by analyzing the communication signal that is provided to the NLP, wherein the NLP communicates with the tone detector to indicate whether the NLP is active or inactive, wherein if the NLP is active, a processing step of the tone detector is disabled.

21. The communication system of claim 20 wherein the NLP is adapted to decide whether or not to enter an active state based at least in part on whether the communication signal is active or inactive, wherein if the communication signal is active, the NLP enters or remains in an inactive state.

22. The communication system of claim 20 wherein the communication signal that the NLP is adapted to receive is a near-end signal and wherein the NLP is adapted to detect whether a far-end signal is active or inactive, wherein if the near-end signal is inactive and the far-end signal is active, the NLP enters an active state.

23. The method of claim 22 wherein if the NLP enters an active state, the NLP suppresses echo present in the near-end signal.

24. The communication system of claim 22 wherein the NLP receives the near-end signal from an echo canceller adapted to receive a near-end communication signal, to sample the far-end communication signal, to cancel echo present in the near-end signal using linear processing, and to provide a resulting echo-compensated near-end signal to the NLP.

25. The communication system of claim 20 wherein if the NLP indicates that the NLP is active, the tone detector enters an inactive state.

26. The communication system of claim 20 comprising a of plurality tone detectors for detecting tones in a communication signal, wherein the NLP communicates with the plurality of tone detectors to indicate whether the NLP is active or inactive, wherein if the NLP is active, a processing step of a plurality of tone detectors are disabled.

27. The communication system of claim 20 wherein the detector comprises a dual-tone multiple-frequency (DTMF) detector adapted to detect DTMF signals in the communication signal and wherein if the NLP indicates that the NLP is active, the DTMF detector ceases to detect DTMF signals in the communication signal.

28. The communication system of claim 20 wherein the detector comprises a call progress detector adapted to detect call progress tones in the communication signal and wherein the call progress detector ceases to detect call progress tones in the communication signal if the NLP indicates that the NLP is active.

29. The communication system of claim 20 wherein the detector comprises a call discriminator adapted to detect facsimile tones and modem tones in the communication signal and wherein the call discriminator ceases to detect facsimile tones and modem tones in the communication signal if NLP indicates that the NLP is active.

30. A method of processing a communication signal in a communication system, comprising:
   (a) receiving a communication signal;
   (b) detecting, with a tone detector, a tone in the communication signal;
   (c) determining whether to perform non-linear processing on the communication signal; and
   (d) disabling a processing step of the tone detector when non-linear processing is being performed on the communication signal.

31. A method of processing communication signals in a communication system having a plurality of detectors for detecting a parameter of a communication signal, comprising steps of:
   (a) receiving a communication signal with a non-linear processor (NLP) adapted to examine the signal and to decide whether or not to enter an active state based upon a parameter of the signal, wherein if the NLP enters an active state, the NLP performs non-linear processing on the signal;
   (b) indicating to the plurality of detectors whether the NLP is active or inactive; and
   (c) if the NLP is active, causing the plurality of detectors to enter an inactive state.

* * * * *